United States Patent Office 3,493,554
Patented Feb. 3, 1970

3,493,554
OLEFIN POLYMERIZATION PROCESS EMPLOYING A CHROMATE CATALYST
Louis J. Rekers, Cincinnati, Ohio, assignor to National Distillers and Chemical Corporation, New York, N.Y.
No Drawing. Filed June 27, 1966, Ser. No. 560,785
Int. Cl. C08f 1/42
U.S. Cl. 260—94.9         10 Claims

ABSTRACT OF THE DISCLOSURE

An alpha-monoolefin is polymerized in the presence of a reducing agent and a bis(diorgano)chromate compound as a catalyst.

---

This invention relates to the catalytic polymerization of olefin hydrocarbons and more particularly to a process and catalyst therein for the polymerization of ethylenically unsaturated hydrocarbons. Still more particularly, the invention relates to a polymerization process utilizing a catalyst system comprising a reducing agent and a bis(diorgano)chromate.

In the process embodied herein, the catalyst system comprises (1) an organometallic compound as reducing agent and (2) a compound of the formula:

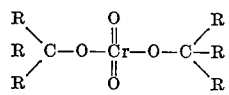

wherein R is a hydrocarbon radical, e.g., alkyl, aryl, arylalkyl, and the like, or combinations of these. As specific examples of compounds falling within the scope of the aforesaid formula and useful for the practice of this invention are the following: bis(triphenylmethyl)chromate (prepared from chromium trioxide and triphenylcarbinol), bis(tributylmethyl)chromate (prepared from tributylcarbinol), and so forth.

This component of the catalyst system of this invention is prepared by any known and convenient means, for example by reacting $R_3CCl$ with $Ag_2CrO_4$, or preferably by reacting chromium trioxide with a triarylcarbinol. In the latter instance, the reactants are heated in any suitable hydrocarbon solvent that is resistant to oxidative attack by the chromium trioxide. Examples of solvents include methylene chloride, carbon tetrachloride, chloroform, hexane, octane, cyclohexane, and decahydronaphthalene, and their mixtures. In general, the solvent is a saturated hydrocarbon of the halogenated, alkyl, or cycloalkyl variety having a reflux temperature between about 15° and 80° C. at 1 atmosphere.

Although the chromium trioxide and the carbinol are reacted preferably in a molar ratio of 1:1, it is possible to use a ratio of chromium trioxide to the carbinol of about 0.2:1 up to about 5:1. Any proportion lower than about 0.2:1 gives a very small amount of usable product while anything above about 5:1 is wasteful of the chromium trioxide. The solvent is employed in the reaction in an amount sufficient to give a total molar concentration of about 0.1 to 5.0 of the initial reactants. The preferred molar concentration in the initial preparation is about 0.4 to 0.5.

The reaction time can vary from a few minutes up to twenty four hours or longer, but the usual reaction time for a high yield is approximately eight hours. The catalyst yield increases with time of reaction and is limited by the amount of reactants used.

The reaction temperature varies depending upon the solvent selected; however, a reflux temperature between about 15° and 80° C. is preferred. For example, when the solvent is methylene chloride, the reaction temperature is about 41° C. at 1 atmosphere pressure.

In reference to the reducing agent that is the other component of the catalyst system embodied herein, particularly suitable and preferred are the trialkylaluminums, such as triethylaluminum, triisopropylaluminum, and triisobutylaluminum. Still other reducing agents embodied for use herein are strong reducing agents such as alkali metals, e.g., sodium; alkaline earth metals, e.g., magnesium and calcium; organoalkali compounds, e.g., alkylsodium; organometallic compounds, e.g., diethyl zinc; and the like, with further specific examples including dibutylmagnesium, diethyl cadmium, metal hydrides such as lithium hydride, magnesium hydride, etc.

Reaction conditions at which the polymerization may be carried out with the novel catalyst system include the following:

*Temperature.*—About 50° to 200° C., preferably about 90° to 125° C.

*Pressure.*—About 50 to 5000 p.s.i., preferably about 200 to 700 p.s.i.

*Ratio of catalyst components (mole ratio of reducing agent to chromate).*—About 0.1 to 5:1, preferably 2.5:1.

*Total catalyst concentration.*—Not critical, but preferably about 0.01 to about 1 percent of catalyst product based on the weight of the ethylenically unsaturated hydrocarbon.

Although the invention, in broad aspects, can be carried out under the aforesaid conditions, particularly suitable results are obtained by use of an aluminum-containing reducing agent, preferably a trialkylaluminum, in combination with the aforesaid compound

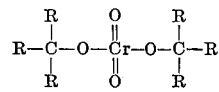

The compounds which may be polymerized according to the present invention consist generally of hydrocarbons, such as the monoolefins containing from 2 to 6 carbon atoms, that are polymerizable when contacted with the aforedefined combination catalyst under polymerizing conditions of temperature and pressure. Specific examples of such polymerizable hydrocarbons include ethylene, propylene, butene-1, pentene-1, hexene-1, 4-methyl-pentene-1, and the like. Mixtures of such hydrocarbons, as for example a mixture of ethylene and butene-1, may also be used for copolymerization with the catalyst system embodied herein.

The polymerization reaction is carried out in either batch, semi-continuous, or continuous operations. Most conveniently, and in the present embodiments, the process at lower pressure operations is carried out in a diluent or liquid reaction medium, the amount not being unduly critical, but it should be at least sufficient to permit effective agitation.

Any suitable anhydrous, oxygen-free organic medium may be used as the solvent for polymerization. Examples include aliphatic alkanes or cycloalkanes such as pentane, hexane, heptane, cyclohexane; hydrogenated aromatics such as decahydronaphthalene; high molecular weight paraffins which are liquid at the reaction temperature; and mixtures thereof. Other suitable reaction media include n-octane, isooctane, methyl cyclohexane, and other inert liquid hydrocarbons.

In carrying out the polymerization reaction at relatively high pressures, such reaction media may be absent or substantially absent, and in such instances the need for solvent recovery systems and the like may be obviated.

It is preferred that the selected reaction medium be essentially free of impurities which may react to destroy catalyst activity or which copolymerize with the olefinic hydrocarbon; that is, appreciable quantities of materials such as carbon dioxide, oxygen, and acetylenic compounds preferably should be absent.

For this process the polymerizable hydrocarbon may be used in substantially pure form, or there may be used a mixture containing major quantities thereof, provided no impurities are present in substantial amounts to destroy the catalyst and/or to contaminate the polymer products. For instance, ethylene obtained by the cracking of hydrocarbon streams is satisfactory if acetylenic and oxygenated materials are not present in more than trace amounts.

In carrying out the polymerization process described herein, it is highly desirable to maintain the polymerization zone free of extraneous gases. This can be done by keeping the reactor blanketed at all times with an inert gas, e.g., operating with nitrogen, argon, or helium. Preferably, the reactor and its contents are blanketed with the polymerization substance, e.g., ethylene gas, to avoid unnecessary dilution of the reactor contents with inert gases.

To describe the invention further, the following examples set forth specific embodiments of catalyst systems embodied herein for polymerizing olefins to high molecular weight polymers.

EXAMPLE I

Chromium trioxide (2.3 grams) and triphenylcarbinol (5.9 grams) were heated in 500-ml., 3-necked Morton flask at 41° C. for 30 minutes, using 90 ml. of methylene chloride as the reaction medium. The unreacted chromium trioxide was filtered off, and the filtrate was evaporated to give a 75 percent yield of bis (triphenylmethyl) chromate, identified by its melting point of 174° C. The product was then applied in solution to a silica gel base which had previously been dried for four hours at 815° C. to give 2 percent by weight of chromium compound on gel catalyst. The residual solvent was then evaporated in a nitrogen stream.

EXAMPLE II

The procedure of Example I was repeated except that the carbinol was tributyl carbinol. The product was bis (tributylmethyl)chromate in a 60 percent yield.

EXAMPLE III

Into a 1-gallon, nitrogen-purged, stirred autoclave reactor were introduced 1000 grams of pentane, 2.88 grams of silica gel impregnated with 2 weight percent of bis(triphenylmethyl)chromate, and 0.15 gram of triethylaluminum. The autoclave was sealed, stirring commenced, the contents heated to 100° C., and ethylene pressure of 355 p.s.i. applied to the solution in the autoclave. Ethylene consumption began almost immediately. The reaction was stopped after 30 minutes by relieving the ethylene pressure. There was recovered 124 grams of polyethylene having a High Load melt index of 2.0 and a density of 0.96.

EXAMPLE IV

Into a 1-gallon, nitrogen-purged, stirred autoclave reactor were introduced 1000 grams of pentane, 3.00 grams of silica gel impregnated with 1 weight percent of bis(tributylmethyl)chromate, and 0.10 gram of triethylaluminum. The autoclave was sealed, stirring commenced, the contents heated to 98° C., and ethylene pressure of 340 p.s.i. applied to the solution in the autoclave. Ethylene consumption began almost immediately. The reaction was stopped after 20 minutes by relieving the ethylene pressure. There was recovered 95 grams of polyethylene having a High Load melt index of 3.5 and a density of 0.96.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A polymerization process which comprises contacting an alpha-monoolefin with a combination catalyst comprising (1) an organometallic compound as a reducing agent selected from the group consisting of trialkylaluminums, alkali metals, alkaline earth metals, alkylsodium compounds, diethyl zinc, dibutyl magnesium, diethyl cadmium and hydrides of lithium and magnesium, and (2) a compound of the formula

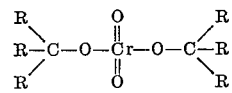

wherein R is a hydrocarbon radical selected from the group consisting of alkyl, aryl, and arylalkyl radicals.

2. The process of claim 1 wherein the reducing agent is a trialkylaluminum.
3. The process of claim 1 wherein R is butyl.
4. The process of claim 1 wherein R is phenyl.
5. The process of claim 1 wherein the monoolefin is ethylene.

6. A polymerization process which comprises contacting an alpha-monoolefin containing from 2 to about 6 carbon atoms at from about 50° to 200° C. at a pressure of about 50 to 5000 p.s.i. with from about 0.01 to about 1 percent, based on the weight of the monoolefin, of a combination catalyst comprising (1) an organometallic compound as reducing agent selected from the group consisting of trialkylaluminums, alkali metals, alkali earth metals, alkylsodium compounds, diethyl zinc, dibutyl magnesium, diethyl cadmium and hydrides of lithium and magnesium, and (2) a compound of the formula

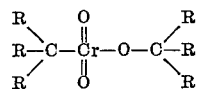

wherein R is a hydrocarbon radical selected from the group consisting of alkyl, aryl, and arylalkyl radicals in which the mole ratio of said reducing agent (1) to said compound (2) is about 0.1 to 5:1 to produce a normally solid polymer of said monoolefin.

7. The process of claim 6 wherein the reducing agent is triethylaluminum, the compound is bis(triphenylmethyl)chromate and the monoolefin is ethylene.

8. The process of claim 6 wherein the reducing agent is triethylaluminum, the compound is bis(tributylmethyl) chromate, and the monoolefin is ethylene.

9. The process of claim 6 wherein the polymerization reaction is carried out in the presence of an inert liquid reaction medium.

10. The process of claim 6 wherein the reaction temperature is about 90° to 125° C., the pressure is about 200 to 700 p.s.i., and the mole ratio of the reducing agent (1) to the compound (2) is about 2.5:1.

References Cited

UNITED STATES PATENTS 3,324,101   6/1967   Baker et al. _____ 260—94.9
3,324,095   6/1967   Carrick et al. _____ 260—94.9

JOSEPH L. SCHOFER, Primary Examiner

E. J. SMITH, Assistant Examiner

U.S. Cl. X.R.

252—431; 260—88.2, 93.7

UNITED STATES PATENT OFFICE
CERTIFICATE OF CORRECTION

Patent No. 3,493,554         February 3, 197

Louis J. Rekers

It is certified that error appears in the above identified patent and that said Letters Patent are hereby corrected as shown below:

Column 4, lines 40 to 44, the formula should appear as show below:

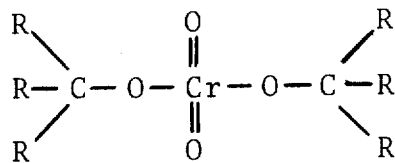

Signed and sealed this 29th day of December 1970.

(SEAL)
Attest:

Edward M. Fletcher, Jr.
Attesting Officer

WILLIAM E. SCHUYLER, JR.
Commissioner of Patents